United States Patent [19]
Harrison

[11] 4,397,477
[45] Aug. 9, 1983

[54] HIGH PRESSURE HYDRAULIC SYSTEMS
[75] Inventor: Anthony W. Harrison, Birmingham, England
[73] Assignee: Lucas Industries Limited, Birmingham, England
[21] Appl. No.: 251,705
[22] Filed: Apr. 6, 1981
[30] Foreign Application Priority Data
Apr. 19, 1980 [GB] United Kingdom ............... 8012972
[51] Int. Cl.³ ............................................ F16K 31/02
[52] U.S. Cl. ................................. 280/709; 280/6 R
[58] Field of Search ............ 267/65 D; 280/714, 6 R, 280/707, 708, 709

[56] References Cited
U.S. PATENT DOCUMENTS
4,212,484 7/1980 Fujii ................................... 280/707
4,270,771 6/1981 Fujii ................................... 280/707

FOREIGN PATENT DOCUMENTS
1158311 7/1919 United Kingdom ............... 280/709

Primary Examiner—Richard A. Bertsch
Attorney, Agent, or Firm—Scrivener, Clarke, Scrivener and Johnson

[57] ABSTRACT

In a high pressure hydraulic system a source supplies pressurized fluid to a slave unit through a control valve which maintains the slave unit in a desired condition. Leakage from the slave unit past the control valve with the source inoperative is undesirable, but it is difficult at high pressures to provide cheaply a control valve with leakproof seals which requires small valve-operating forces. The control valve therefore has first and second ports communicating with the source and the slave unit, and a valve member movable to close either port or to an open position to allow communication between the ports. Movement of the valve member is controlled by the pressure differential across it; fluid flow past it, and forces produced by valve-operating solenoids. The slave unit may be an hydraulic suspension strut, and the system may comprise a vehicle suspension levelling system, with the solenoids and the source being manipulated as required by an electronic control system.

11 Claims, 5 Drawing Figures

HIGH PRESSURE HYDRAULIC SYSTEMS

This invention relates to high pressure hydraulic systems of the kind in which a slave unit, for example an hydraulic suspension strut of a vehicle hydraulic suspension system, is supplied with fluid under pressure from a source through a control valve assembly which is operative to maintain the slave unit in a desired condition.

In an hydraulic system of the kind set forth, the problem of controlling leakage past the control valve assembly when the source is inoperative may arise. This problem can be solved by the use of elastomeric seals, but if a valve with such a seal opens against a pressure differential the seal is liable to extrusion. The seal must resist extrusion if it is to have a reasonable life, but as the pressure in the system is raised the seal needs to be made of stiffer material to resist extrusion, and eventually a pressure is reached where the stiffness required reduces the sealing efficiency to an unacceptable level. Pressures above this will be defined as "high pressures".

A further problem that occurs in hydraulic systems of the kind set forth is that of minimising the force required to operate valves in the control valve assembly, so that, for example, if the valves are solenoid-operated, the current taken by the solenoids will not be excessive.

In one known high pressure hydraulic system of the kind set forth the control valve assembly comprises two solenoid-operated valves, oppositely acting and arranged in series between the source and the slave unit, each valve being closed to prevent flow through the valve in one direction and opened to permit flow in both directions under the control of the solenoid and the pressure differential acting across the valve, and a seating portion on a first valve is of elastomeric material to provide a leakproof seal when that valve is closed.

In this known construction therefore leakage from the slave unit past the control valve is prevented by the leakproof seal on the first valve, but that seal is able to resist extrusion as the solenoids are not sufficiently powerful to open the valves against a significant pressure differential. However, this construction has the disadvantage that the provision of two valves makes the assembly relatively complex to manufacture. Further, when the construction is such that each valve when in the closed position prevents flow in a direction from the other valve a trapped volume is created between the two valves, and to avoid this a small leak must be provided past the second valve, which may be difficult to control within normal manufacturing tolerances.

According to the present invention, in a high pressure hydraulic system of the kind set forth, the control valve assembly has first and second ports communicating with the source and the slave unit respectively, and a valve member movable between alternative closed positions in which it closes either the first or the second port, and an open position in which communication between the ports is permitted, movement of the valve member being controlled by the pressure differential acting across it, fluid flow past the valve member and valve-operating forces produced by valve-operating means associated with each port, and the control valve assembly is also provided with elastomeric sealing means to provide a substantially leakproof seal at least when the first port is closed by the valve member.

Providing one valve member instead of two means that the control valve assembly becomes simpler, ligh-ter and cheaper to manufacture, while retaining the advantages of the leakproof seal and small valve-operating forces. The provision of one valve member instead of two also avoids the problem of the trapped volume, and the consequent need to provide a small leak across the second valve.

Preferably, the elastomeric sealing means is provided on the valve member, and may also provide a substantially leakproof seal when the second port is closed by the valve member.

Activation of each valve-operating means conveniently provides a valve-operating force which tends to urge the valve member to close the associated port.

When neither of the valve-operating means are activated the position of the valve member is determined principally by the pressure differential acting across it. When a port is closed by the valve member due to the pressure differential and the associated valve-operating means is activated, a reversal of the pressure differential and fluid flow will move the valve member into the open position but the valve-operating force is sufficient to prevent the valve member from closing the other port, so that the control valve assembly acts as a one-way valve. However, when one port is closed by the valve member due to the pressure differential activation of the other valve-operating means will not move the valve member against a significant pressure differential.

Preferably the source is normally maintained at a low pressure, but when operative it is cycled slowly and continuously over a range of pressures which includes and exceeds, the range of pressures which occur in the slave unit. Normally the valve-operating means associated with both the ports are not activated, and so, since the slave pressure is higher than the source pressure, the valve member closes the first port.

If the slave pressure is to be increased, the source pressure is cycled, and the valve-operating means associated with the first port is activated. When the source pressure reaches the slave pressure the valve member will move into the open position to permit fluid to flow into the slave unit. When the required slave pressure is reached, the valve-operating means is de-activated, and the fluid flow causes the valve member to close the second port. When the source pressure falls below the slave pressure the pressure differential will cause the valve member to close the first port.

If the slave pressure is to be decreased, the source pressure is cycled, and when the source pressure reaches the slave pressure the valve member closes the second port. When the source pressure starts to fall, the valve-operating means associated with the second port is activated, so that when the source pressure reaches the slave pressure, the pressure differential opens the valve to permit fluid to flow out of the slave unit. When the required slave pressure is reached the valve-operating means is de-activated, and fluid flow moves the valve member to close the first port.

Conveniently each valve-operating means comprises a solenoid which, when activated by energisation of the coil, acts on an electromagnetic plate assembly to provide an electromagnetic valve-operating force. Energisation and de-energisation of the solenoids is preferably controlled by an electronic control system which may also control operation of the source.

Different methods of increasing and decreasing the slave pressure may be used by altering the electronic control system. Further, a common source may be used to operate two slave units, the control valve assemblies being combined in one housing and being arranged in parallel, but oppositely acting.

In one embodiment the slave unit comprises an hydraulic suspension strut. In this case pressure in the strut can be considered as a static pressure, due to the weight of the vehicle, and a dynamic pressure, due to ride movement, superimposed to produce a "ripple" at ride frequency. The static pressure will vary due to changes in the loading on the vehicle. Changes in these pressures will cause changes in ride height signals, in response to which the electronic control system manipulates the operation of the source and the control valve assembly to operate a suspension levelling system.

Such a system will operate as described above, although it should be ensured that the "ripple" in the strut pressure does not affect the movement of the valve member into the open position when the solenoid of the first port is energised, by affecting the pressure differential across the valve member.

In such a suspension system, the pressure source conveniently comprises a manifold for supplying at least two struts simultaneously, for example the suspension struts of a pair of wheels on opposite sides of a vehicle, and the control valve assemblies are conveniently combined in one housing.

One embodiment of our invention and a modification are illustrated in the accompanying drawings in which.

Figure 1:
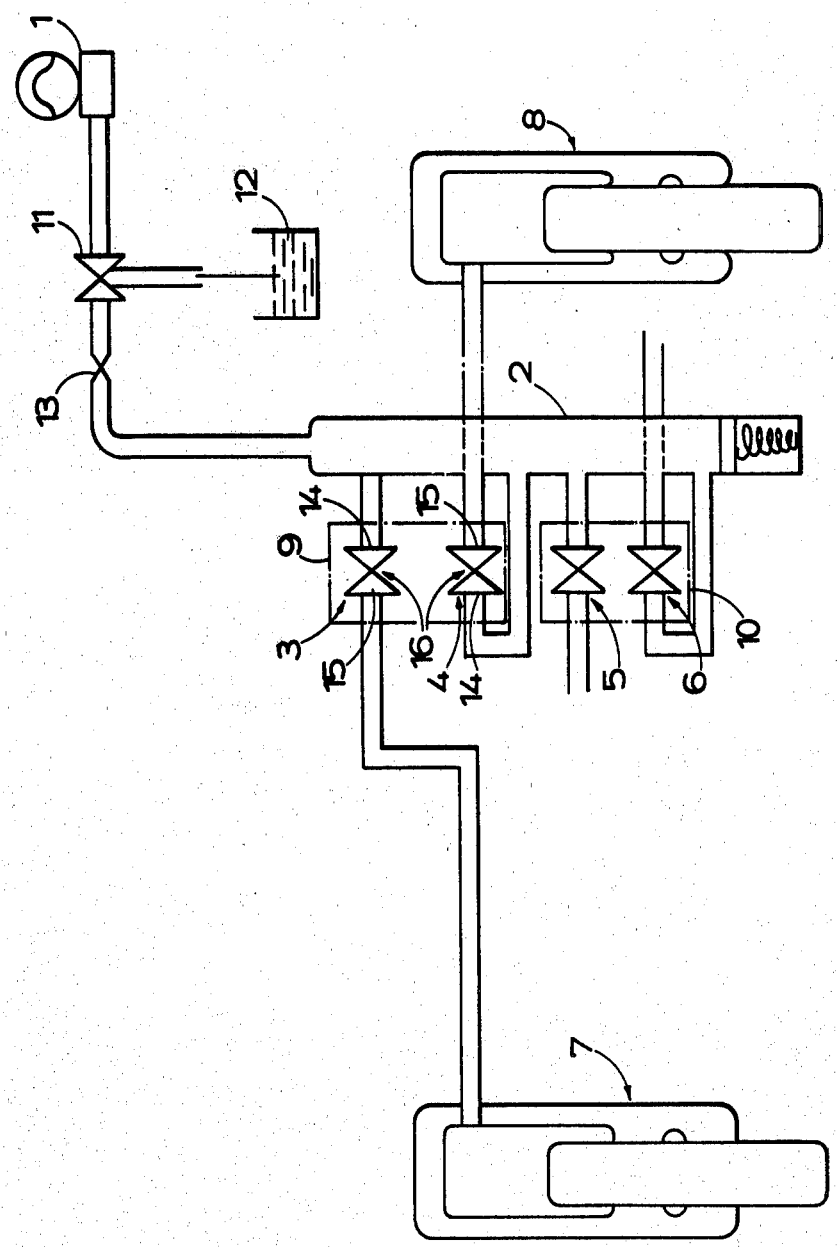
FIG. 1 is a layout of a high pressure hydraulic suspension levelling system for a vehicle.

In the high pressure hydraulic suspension levelling system illustrated in the layout of FIG. 1, hydraulic fluid from an hydraulic pressure source 1, suitably an accumulator, is supplied from a common manifold 2 to slave units comprising two pairs of hydraulic suspension struts through control valve assemblies 3,4,5 and 6. One pair of struts 7,8 is illustrated, the struts of each pair being arranged to support a pair of wheels on opposite sides of the vehicle. In this embodiment the control valve assemblies 3 and 4, 5 and 6 of each pair of struts are combined in one assembly 9,10 respectively, the control valves 3 and 4 being arranged to act oppositely.

A three-way valve 11 is interposed between the source 1 and the manifold 2, the valve 11 being adapted to connect the manifold 2 either to the source 1, or to a reservoir 12 at atmospheric pressure. An orifice 13 is interposed in the line between the valve 11 and the manifold 2.

Each control valve assembly 3,4,5 or 6 has a first port 14 in communication with the manifold 2, and a second port 15 in communication with the strut 7,8. A valve member 16 is movable between alternative closed positions in which it closes either the first port 14, or the second port 15, and an open position in which communication between the ports 14,15 is permitted. Movement of the valve member 16 is controlled by the pressure differential acting across it, fluid flow past it, and valve-operating forces produced by valve-operating means associated with each port 14,15. The valve member 16 is provided with elastomeric sealing means (not shown in FIG. 1) which provides a substantially leak-proof seal when the valve member 16 closes either port 14 or 15. The valve-operating means comprise solenoids which when energised act through electromagnetic plate assemblies to provide electromagnetic valve-operating forces which tend to urge the valve member to close the associated port.

Figure 2:
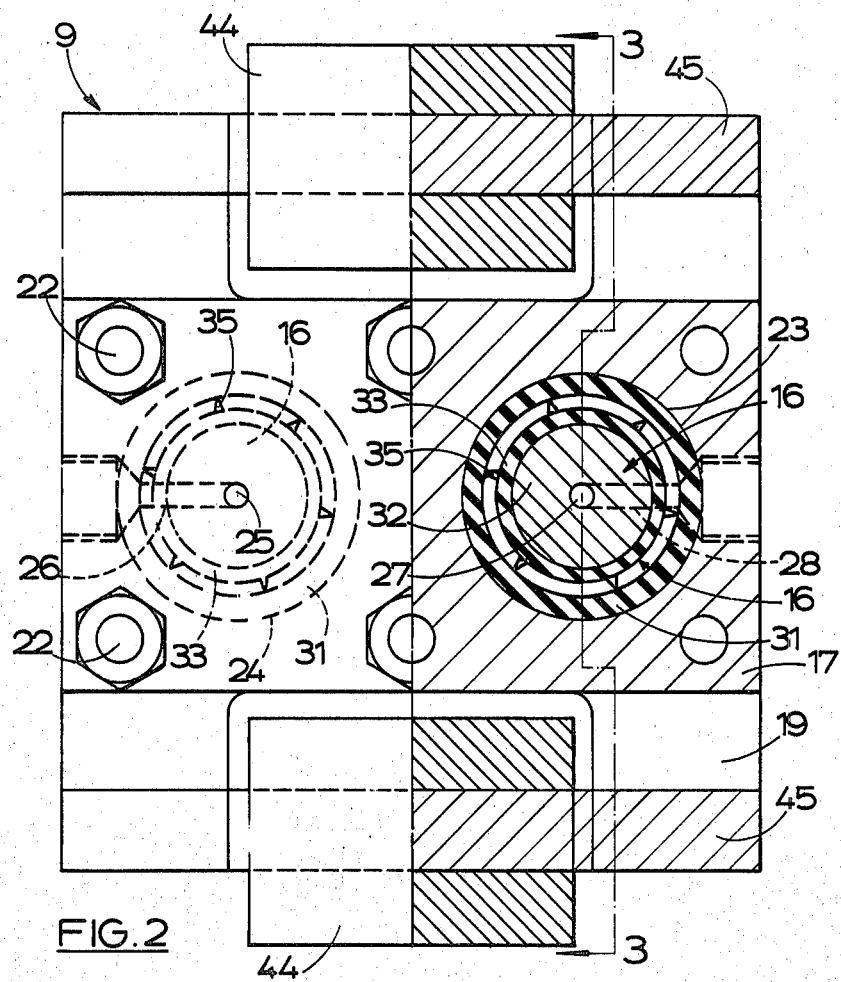
FIG. 2 shows a control valve assembly for use in the system of FIG. 1, and is a half-section along the line 2—2 of FIG. 3.
Figure 3:
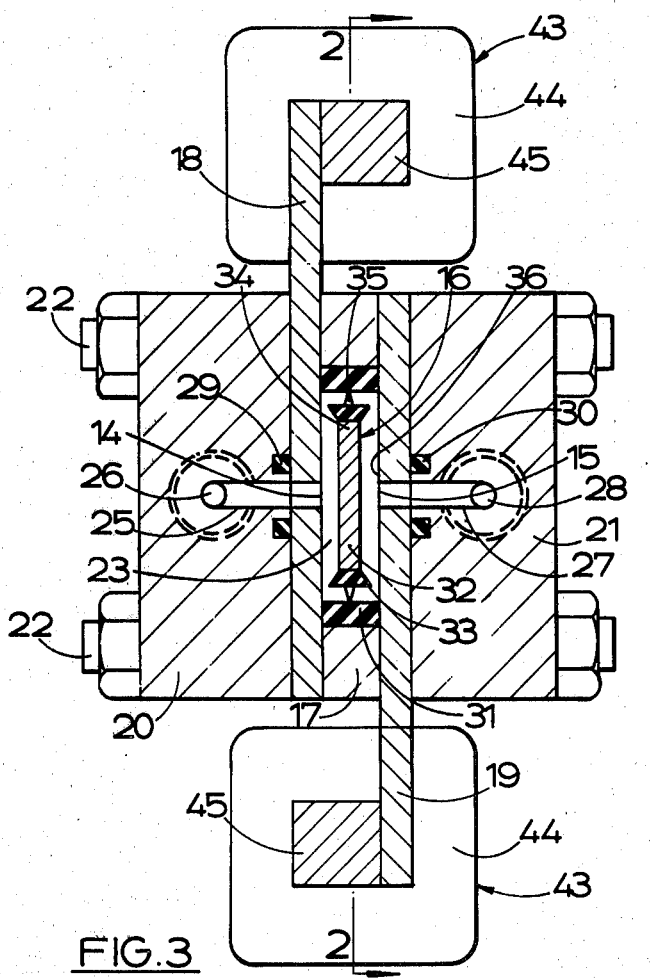
FIG. 3 is a section along the line 3—3 of FIG. 2.

A pair of control valve assemblies 3 and 4, combined into one assembly 9 is illustrated in FIGS. 2 and 3. The assembly 9 comprises a plate 17 clamped between two electromagnetic plate assemblies 18,19 which in turn are clamped by housing pieces 20,21 by means of studs 22. The plate 17 is provided with two circular holes which form valve cavities 23,24 in each of which the valve member 16 of a control valve assembly 3,4 is located. The construction of one control valve assembly 3 only will be described, as the other is identical, but arranged to act oppositely.

The first port 14 opens onto one side of the valve cavity 23 and is connected to the manifold 2 through passages 25,26 in the electromagnetic plate assembly 18 and the housing piece 20. The second port 15 opens onto the other side of the cavity 23, and is connected to the strut 7 through passages 27,28 in the electromagnetic plate assembly 19 and the housing piece 21. (The control valve assembly 4 is connected oppositely). Sealing rings 29,30 at the interfaces of the electromagnetic plate assemblies and the housing pieces, and a seal 31 at the periphery of the valve cavity 23 prevent fluid pressure leakage.

The valve member 16 is in the form of a circular valve plate 32 which has the elastomeric sealing means in the form of a rubber sealing ring 33 of trapezoidal section bonded to its peripheral edge 34. Several flexible rubber fingers 35 moulded integrally with either the seal 31 or the sealing ring 33 allow the valve plate 32 to move between its closed positions, in which the ports 14,15 are closed by the ring 33 sealing against the surface 36 of the respective electromagnetic plate assembly 18,19. When the solenoids are de-energised, so that there is no valve-operating force, movement of the valve plate 32 is controlled by the pressure differential, and the clearance allowed for this movement must be small enough to ensure rapid movement from one closed position to the other when the pressure differential reverses. However, the clearance must also be large enough to ensure that, when one port e.g. 14 is closed by pressure and the solenoid associated with the other port 15 is energised, the valve member will not close the other port 15 against a significant pressure differential. Similarly, the clearance must also be large enough to ensure that, when one port e.g. 14 is closed and the associated solenoid is energised, the valve member 16 will not close the other port 15 under all possible conditions of fluid flow and pressure differential, although in this case the valve member 16 may be held in the open position, and allow the control valve to act as a one-way valve.

Figure 4:
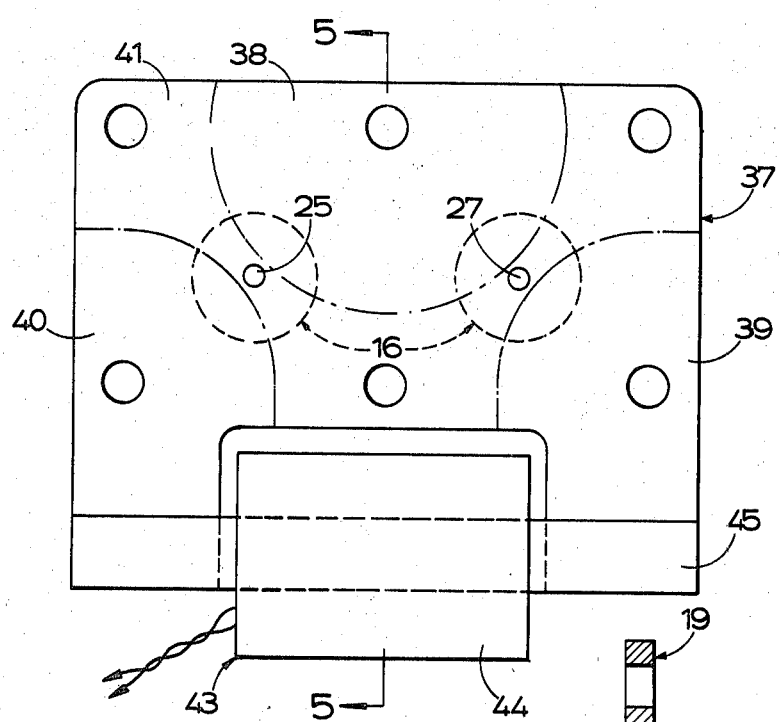
FIG. 4 shows a valve-operating means of the control valve assembly of FIGS. 2 and 3.
Figure 5:
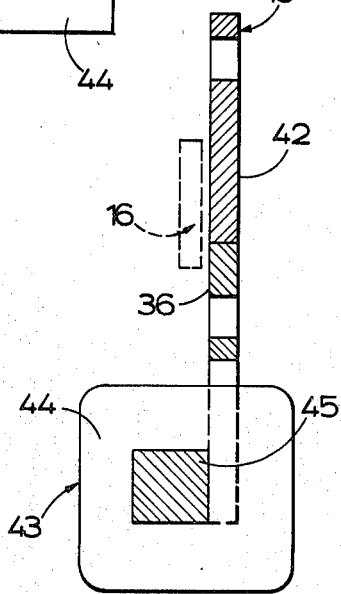
FIG. 5 is a section on the line 5—5 of FIG. 4.

An electromagnetic plate assembly is shown in more detail in FIGS. 4 and 5. A composite plate 37 forms the pole pieces, and comprises soft iron parts 38,39,40 separated by non-magnetic material 41, suitably austenitic steel. The parts are joined, and form a pressure-tight plate, which is then ground flat and parallel to a smooth finish on both sides 36,42 to provide adequate hydraulic sealing surfaces. A solenoid 43 comprising a coil 44 wound round a soft iron core 45 is attached to the plate 37 with well fitting joints to provide a low reluctance magnetic path. The dotted lines show the location of the valve members 16, which straddle the non-magnetic section 41, and complete the magnetic path. Thus on energisation of the solenoid 43 the valve members 16 of both control valve assemblies 3,4 are attracted to the surface 36.

In operation, the three-way valve 11 is used to cycle the pressure in the manifold 2 over a range which includes, and exceeds the range of static pressures which occur in any of the struts 7,8. The frequency of the cycle is determined by the size of the orifice 13, and an electronic control system controls the operation of the cycle and the energisation and de-energisation of the solenoids in response to ride height signals.

Normally, the pressure in the manifold 2 is low, and the solenoids are de-energised, so that each valve member 16 closes the first port 14 due to the pressure in the respective strut 7,8.

Operation of the control valve assemblies will be described with reference to the assembly 9. If the manifold pressure is cycled and the solenoids remain de-energised, each valve member 16 will move to close its second port 15 when the manifold pressure reaches the strut pressure, and move to close its first port 14 when the manifold pressure falls below the strut pressure again.

If the pressure in the strut 7 is to be increased, the manifold pressure is cycled, and the solenoid 43 associated with the first port 14 of control valve 3 is energised. When the manifold pressure reaches the pressure in the struts 7,8, the valve member 16 of control valve 4 moves to close the second port 15 (due to the electromagnetic force and the pressure differential) while the electromagnetic force will act against the pressure differential and the fluid flow to hold the control valve 3 open so that it acts as a one-way valve to allow fluid to flow into the strut 7. When the desired pressure is reached, the solenoid is de-energised, and so the fluid flow will move the valve member 16 of control valve 3 to close the second port 15. The manifold pressure will continue to rise, but when it again falls below the pressures in the strut 7,8, both valve members will move to close their first ports again.

In an alternative method, the electronic control system allows the manifold pressure to fall immediately the solenoid is de-energised.

If the pressure in the strut 7 is to be decreased, the manifold pressure is cycled, and when the manifold pressure reaches the strut pressures, both valve members will move to close their second ports 15. When the manifold pressure starts to fall, the solenoid associated with the second port 15 of control valve 3 is energised, so that when the manifold pressure reaches the strut pressure, the valve member 16 of control valve 4 moves to shut the first port 14, while the control valve 3 is held open and acts as a one-way valve to allow fluid to flow out of the strut 7. When the desired pressure is reached the solenoid is de-energised, and the fluid flow moves the valve member 16 to close the first port 14 of the control valve 3.

In a modification, the control valve assemblies 3, 4,5 and 6 may be separate. In this case, the same methods of increasing and decreasing strut pressure may be used, particularly the alternative method for increasing the strut pressure. An alternative method of decreasing the strut pressure for a single control valve assembly energises the appropriate solenoid at the start of the manifold pressure cycle rather than when the pressure starts to fall, but otherwise is the same as the method given above.

It will be appreciated that the system could be modified to operate if the pressure in the manifold 2 is normally high, and is cycled down then up.

Further, it will also be appreciated that the means for cycling the manifold pressure may be modified. In one modification (not shown) the pressure source comprises a pump, and the manifold pressure is increased directly by the pump being driven in response to the signals controlling the valve 11. In this case, the manifold pressure may be decreased by reversal of the pump, in spite of any fluid flow out of the strut. In this modification the orifice 13 can be omitted.

In a second modification (not shown) the pressure source comprises a continuously driven pump, and the valve 11 and orifice 13 are omitted. Flow from the pump is by-passed to the reservoir 12 through a solenoid valve. Signals from the electronic control system operate the solenoid valve to close and open the bypass, causing the manifold pressure to increase and decrease respectively.

I claim:

1. A high pressure hydraulic system comprising a source of high pressure fluid, a slave unit and a control valve assembly, fluid from said source being supplied to said slave unit through said control valve assembly which is operative to maintain said slave unit in a desired condition, said control valve assembly having first and second ports, said first port communicating with said source and said second port communicating with said slave unit, a valve member movable between a first closed position in which said valve member closes said first port, a second closed position in which said valve member closes said second port, and an open position in which communication between said first and second ports is permitted, movement of said valve member being controlled by forces produced by a first means comprising a solenoid assembly associated with each port, by a second means comprising means for applying a pressure differential across said valve member and by a third means comprising means for causing fluid flow past said valve member, said forces produced by energisation of said solenoid assemblies being of predetermined values, such that when a solenoid assembly of said first means is energized and said second means produces a force which opposes and exceeds the predetermined value of the solenoid force, said first means is unable to move said valve member, and said control valve assembly also having an elastomeric sealing means to provide a substantially leakproof seal at least when said valve member closes said first port.

2. A high pressure hydraulic system as claimed in claim 1, wherein said elastomeric sealing means is provided on said valve member.

3. A high pressure hydraulic system as claimed in claim 1, wherein said elastomeric sealing means also provides a substantially leakproof seal when said valve member closes said second port.

4. A high pressure hydraulic system as claimed in claim 1, wherein energisation of each said solenoid assembly provides said predetermined solenoid force which tends to urge said valve member to close said associated port.

5. A high pressure hydraulic system as claimed in claim 1, wherein the position of said valve member is determined by pressure differential forces produced by said second means when said solenoid assemblies of said first means are not energised, and when one said port is closed by said valve member due to said pressure differential forces and said associated solenoid assembly is energised, a reversal of said pressure differential forces and said fluid flow will move said valve member into said open position but said predetermined solenoid force will be sufficient to prevent said valve member from closing the other said port so that said control valve assembly acts as a one-way valve, and when one said port is closed by said valve member due to a pressure differential force which exceeds said predetermined solenoid force produced by energisation of the other said solenoid assembly will not move said valve member.

6. A high pressure hydraulic system as claimed in claim 1, wherein said source is normally maintained at a low pressure, but when operative is cycled slowly and continuously over a range of pressures which includes and exceeds the range of pressures which occur in said slave unit.

7. A high pressure hydraulic system as claimed in claim 6, wherein to increase the pressure in said slave unit, said source pressure is cycled, and said solenoid assembly associated with said first port is energised, so that when said source pressure reaches said slave pressure said valve member moves into said open position to permit fluid to flow into said slave unit, until the required slave pressure is reached, whereupon said solenoid assembly is de-energised, and fluid flow causes said valve member to close said second port, until said source pressure falls below said slave pressure, when said pressure differential force causes said valve member to close said first port.

8. A high pressure hydraulic system as claimed in claim 6, wherein to decrease the pressure in said slave unit said source pressure is cycled, and when said source pressure raches said slave pressure said valve member closes said second port, and when said source pressure starts to fall, said solenoid assembly associated with said second port is energised, so that when said source pressure reaches said slave pressure, said pressure differential force moves said valve member into said open position to permit fluid to flow out of slave unit, until the required slave pressure is reached, whereupon said solenoid assembly is de-energised, and fluid flow moves said valve member to close said first port.

9. A high pressure hydraulic system as claimed in claim 1, wherein each said solenoid assembly comprises a solenoid which acts on an electromagnetic plate assembly to provide said predetermined force, and energisation and de-energisation of said solenoid assemblies is controlled by an electronic control system.

10. A high pressure hydraulic system as claimed in claim 1, wherein said slave unit comprises an hydraulic suspension strut.

11. A high pressure hydraulic system as claimed in claim 1, wherein said source supplies at least one hydraulic suspension strut for a wheel of a vehicle, and incorporating an electronic control system for manipulating energisation of said solenoid assemblies and said source in response to ride height signals to contitute a suspension levelling system.

* * * * *